Sept. 6, 1927. 1,641,912
G. WALKER
BRAKE
Filed April 12, 1926 3 Sheets-Sheet 2
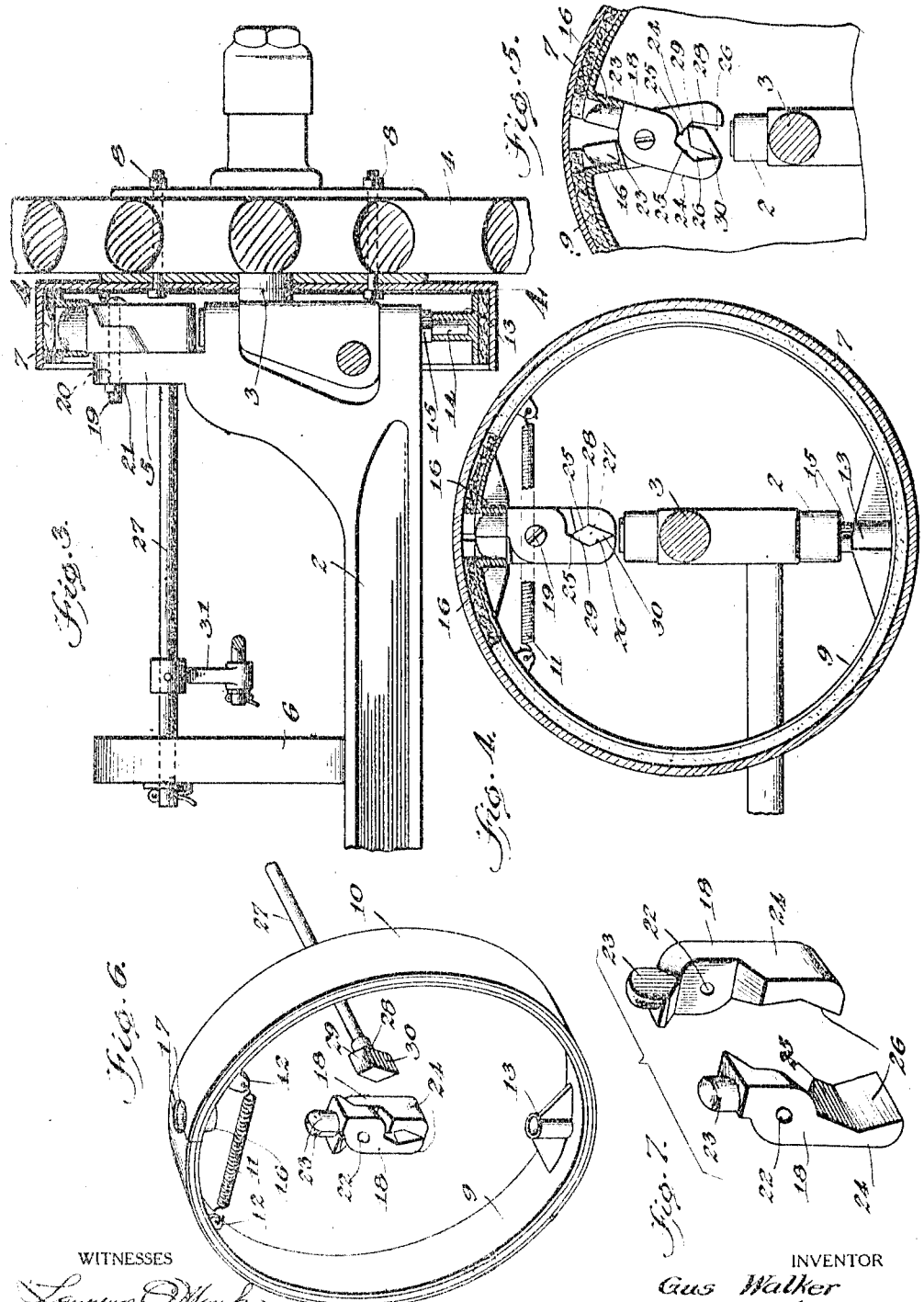
WITNESSES
INVENTOR
Gus Walker
BY
ATTORNEYS

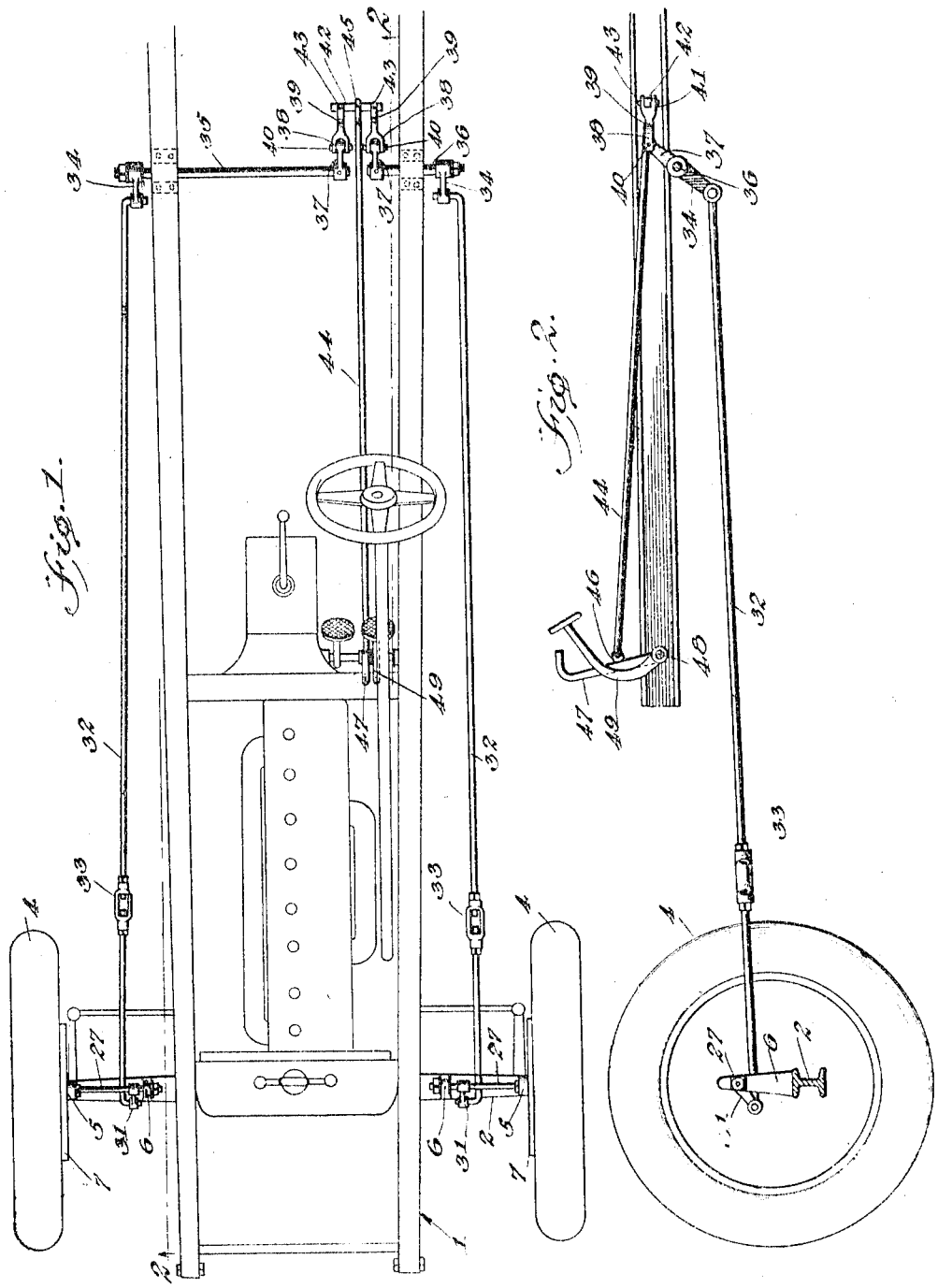

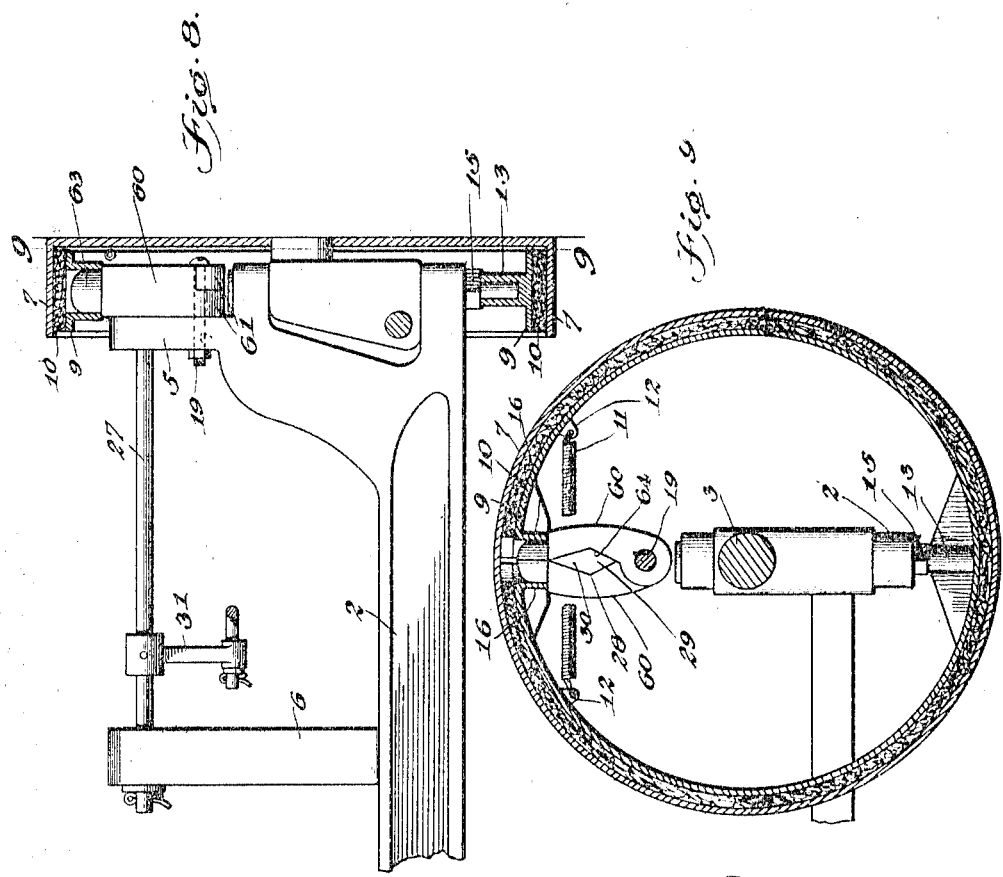

Patented Sept. 6, 1927.

1,641,912

UNITED STATES PATENT OFFICE.

GUS WALKER, OF HUNTINGTON, WEST VIRGINIA.

BRAKE.

Application filed April 12, 1926. Serial No. 101,489.

My invention relates generally to brakes for motor vehicles, more particularly to brakes for the front or steering wheels of automobiles, and it consists in the combinations, constructions and arrangements herein described and claimed.

An object of the invention is the provision of a brake mechanism which affords, simple, reliable, and readily operable facilities for applying a braking action on each of the front wheels of an automobile when desired, either when the front wheels of the automobile are parallel to the longitudinal axis of the automobile or turned at any usual angle to the longitudinal axis of the automobile.

A further object of the invention is the provision of a brake mechanism which is adapted to effect a quick and positive application of a braking action on each of the front wheels of an automobile which is equipped with the invention, even though considerable wear shall have taken place between relatively movable brake members of the device for either or both of the front wheels of the automobile.

Other objects and advantages of the invention will be apparent from the following description, considered in conjunction with the accompanying drawings, in which Figure 1 is a more or less diagrammatic and fragmentary plan view of a portion of the chassis of an automobile and such operating members of the automobile as are associated with a brake mechanism embodying the invention and with which the automobile is equipped, Figure 2 is a fragmentary vertical section taken substantially along the line 2—2 of Figure 1, Figure 3 is a fragmentary transverse vertical section through a front wheel of the automobile and through certain parts of the brake mechanism shown in Figure 1, other parts of the automobile and of the brake mechanism being shown in elevation, Figure 4 is a vertical section substantially along the line 4—4 of Figure 3, showing in inactive positions certain elements of the brake actuating mechanism shown in Figures 1 and 3, Figure 5 is a fragmentary sectional view similar to Figure 4, showing certain elements of the brake actuating mechanism in active positions, Figure 6 is a perspective group view of an expansible brake ring, which is used in the device, and certain of the elements of the brake ring expanding means shown in the preceding views, Figure 7 is a perspective view of a pair of brake ring spreading or expanding levers of the actuating mechanism exhibited in the preceding views, Figure 8 is a view similar to Figure 3, showing a slightly modified form of brake actuating mechanism, Figure 9 is a section substantially on the line 9—9 of Figure 8, Figure 10 is a perspective view of the brake ring spreading levers of the modified form of brake actuating mechanism, and Figure 11 is a perspective view of the modified form of brake ring spreading levers separated from one another.

Referring now to Figure 1 of the drawings, the numeral 1 generally designates the frame of an automobile and 2 is the front axle on which the front end portion of the frame is supported in any suitable known manner. The front axle 2 carries the usual pivoted spindles, as at 3, on which the front or steering wheels 4 are mounted. In carrying out the invention, the end portions of the front axle 2 are provided at their extremities and adjacent to the inner sides of the wheels 4 with upstanding supporting arms 5 which are located above the levels of the axes of the adjacent spindles 3 and which may be formed integrally with the axle 2, as shown in Figures 3 and 8 or may be formed separately from the front axle and secured thereto in any suitable known manner. The front axle 2 also is provided inwardly of the upstanding supporting arms 5 with other upstanding supporting arms 6 which also may be formed integrally with the axle 2, as shown in Figures 3 and 8. By referring to Figure 1, it will be seen that the supporting arms 6 are located at the outer sides of the side members of the frame 1 of the automobile.

A brake drum 7 is provided for each of the wheels 4. Each brake drum is secured firmly to the associated wheel 4 at the inner side of the latter by suitable fastening devices such as the bolts and nuts generally indicated at 8, whereby each brake drum will be supported in concentric relation with the associated wheel 4. A resilient split spring brake ring 9 is provided for each brake drum 7. Each brake ring 9 has a covering 10 of suitable fabric on its outer periphery extending from one end of the split brake ring to the opposite end thereof and each brake ring is adapted to fit rather snugly in the associated brake drum, which is open at its inner side, when the brake ring is in its contracted position as shown in Figures 4, 6 and 9.

Each brake ring 9 is normally held in its contracted condition by means of a retractile spring 11, the ends of which are attached to inwardly extending ears 12 on the inner faces of the end portions of the spring ring 9, the ears 12 being located at slight distances from the extremities of the end portions of the spring ring 9.

Each spring ring 9 is provided on its inner face intermediate its ends with an inwardly extending socket member 13 which is open at its inner end and is adapted to fit over the depending lower end portion 14 of the usual vertically disposed spindle block pivot bolt 15 at the adjacent end of the axle 2. Each spring ring 9 is provided at its ends with inwardly extending complementary semi-cylindrical members 16 which have their edges in abutting relation to each other when the spring ring is contracted and then constitute a socket that is diametrically opposite the socket 13. The end portions of each spring ring 9 have notches 17 in their meeting edges which define an opening when the spring ring is in contracted position. The opening that is formed by the notches 17 is practically coextensive in area with the cross sectional area of the socket that is formed of the members 16. Each ring 9 has spreader means associated therewith for expanding the ring against the inner periphery of the associated brake drums. Such spreader means may comprise a pair of spreader levers 18 having their middle portions disposed flatwise against each other and supported in juxtaposed relation on a pivot bolt 19 which has a threaded portion screwed into a transverse screw threaded opening 20 in the upper end portion of the adjacent supporting arm 5, a lock nut 21 being disposed on the extending inner end portion of the bolt 19 to prevent accidental displacement of the latter. The bolt 19 extends through aligned transverse openings 22 in the middle portions of the levers 18 and the levers 18 thus are supported at the outer side of the associated supporting arm 5 and in the space within the associated spring ring 9.

The upper end portions of the levers 18 are reduced as indicated at 23 to fit within the socket 16—16 when the associated spring ring 9 is in its contracted position. The reduced upper end portions 23 of the levers 18 have the outer walls thereof curved convexly transversely thereof to conform to the transverse curvature of the inner walls of the members 16. The upper ends of the portions 23 of the levers 18 are rounded or convexly curved as best seen in Figures 4, 6 and 7.

The lower end portions of the levers 18 are enlarged in thickness as indicated at 24 and are provided with similar angular notches in their inner or confronting walls, each of said notches subtending an obtuse angle and comprising a relatively short upper wall 25 and a longer lower wall 26.

A rock shaft 27 is provided for each pair of levers 18. Each rock shaft 27 is journaled in aligned openings in the supporting arms 5 and 6 on an end portion of the axle 2 so that the axis of the rock shaft 27 is located at the level of the lines of juncture of the walls 25 and 26 of the notches in the lower end portions 24 of the associated levers 18 and the outer end portion of the rock shaft 27 extends between the lower end portions 24 of the associated levers 18. The outer end portion of the rock shaft 27 carries a cam member 28 which comprises a relatively short upwardly extending V-shaped cam projection 29 and a longer V-shaped downwardly or oppositely extending cam projection 30. The upwardly extending cam projection 29 has convergent inclined side walls which contact with the walls 25 of the notches in the lower end portions of the levers 18 when the lower end portions of the levers 18 reach the limit of their movements toward each other. At this time, the convergent inclined side walls of the cam projection 30 are in contact flatwise with the walls 26 of the notches in the lower end portions of the associated levers 18. It thus will be apparent that rocking of the shaft 27 will spread the lower end portions of the associated levers 18 from the positions shown in Figure 4 to the positions shown in Figure 5 and that the upper portions of the levers 18 likewise will be spread and will cause the members 16 to be spread apart equal distances from the vertical plane of the axis of the associated rock shaft 27, thus expanding the associated spring ring 9 against the inner wall of the associated brake drum uniformly at opposite sides of the ends of the brake ring. This will be true because the cam projection that is farthest from the fulcrum of the levers 18 is of greater length than the cam projection that is at the side of the rock shaft next to the fulcrum of the levers 18.

The rock shafts 27 on the opposite end portions of the axle 2 carry forwardly and downwardly inclined and similarly disposed rocker arms 31. Similar motion transmitting rods 32 are provided at opposite sides of the frame of the automobile and have inwardly curved forward end portions pivotally attached to the rocker arms 31. Each of the rods 32 may comprise sections connected adjustably by a turnbuckle 33 so that the length of the rod 32 can be varied within limits as desired. The rearward end portions of the rods 32 are turned inward and are pivotally attached to the end portions of forwardly and downwardly inclined rocker arms 34 on axially aligned transverse rock shafts 35 and 36, respectively. The adjacent ends of the rock shafts 35 and 36 terminate short of each other and the rock shaft 36 is of less length than the rock shaft 35. The rock shaft 36 is journaled in a bearing in the side frame member of the automobile that is nearest to the operating mechanism of the automobile while the shaft 35 is journaled in a bearing in the other side member of the automobile frame. The inner end portions of the shafts 35 and 36 carry upwardly and rearwardly inclined rocker arms 37. The end portions of the arms 37 are straddled by horizontally spaced forks 38 at the forward ends of links 39 and are connected to the forks 38 by horizontal pivot elements 40. The rearward end portions of the links 39 are formed to produce vertically spaced forks 41 which straddle the end portions of a flat compensating bar 42 and are connected to the latter pivotally by vertical pivot elements 43. An operating rod 44 is attached adjacent to its rearward end by means of a vertical pivot element 45 with the middle portion of the compensating bar 42 and the forward end portion of the rod 44 is turned laterally to produce a horizontal pivot element which is engaged with a horizontal opening in a rearwardly extending ear 46 on the middle portion of a brake operating lever 47. The brake operating lever 47 normally is inclined forwardly and upwardly and is fulcrumed at its lower end on the shaft 48 on which the lower end portion of the usual clutch lever 49 is mounted. The upper end portion of the lever 47 is curved to lie in the path of possible movement of the pedal at the upper end of the clutch lever 49 and the lever 47 will be swung forwardly after the clutch lever 49 has moved forward a certain distance. This distance is sufficient to permit a full operating stroke of the clutch lever without actuation of the brake lever.

From the foregoing description of the various parts of the device, the operation thereof may be readily understood. The retractile springs 11 will hold the brake rings out of close frictional engagement with the brake drums normally when the levers 18 are in the positions shown in Fig. 4. The front or steering wheels then may turn freely on the spindles 3. The operator of the car may swing the clutch lever 49 forward by foot pressure a distance sufficient to swing the clutch in gear without actuation of the brake lever 47. However, if it is desired to apply the brakes to the front or steering wheels, the clutch lever is swung forward further and after contacting with the upper end of the brake lever 47, the latter also is swung forward, thereby causing motion to be transmitted to the rock shafts 27, which are rocked as required to cause the lower end portions of the levers 18 to swing apart to the positions shown in Figure 5 and the upper end portions of the levers 18 to swing apart to the positions also shown in Figure 5. This spreading of the upper ends of the levers 18 will cause spreading of the members 16 and circumferential expansion of the brake rings to the extent required to frictionally engage with the brake drums, and to then exert a braking action on the front or steering wheels. The compensating cross bar 42 will swing about the parallel vertical pivots 43 and 45 as required to assure firm application of the brakes for both front wheels of the automobile even though the wear on the cover of the brake ring of the brake for one front wheel is greater than the wear on the cover of the brake ring for the other front wheel.

The modified form of brake ring spreading mechanism exhibited in Figures 8 and 9 differs from the hereinbefore described brake ring spreading mechanism only in the form and mounting of the brake ring spreading levers. The modified form of brake ring spreading mechanism comprises a pair of levers 60 which are shown per se in Figures 10 and 12. The levers 60 have lower end portions 61 which are formed with aligned openings 62 through which the outer end portion of the associated pivot bolt 19 extends. The inner end portion of the pivot bolt 19 on which the levers 60 are supported is threaded through an opening 62 in the lower end portion of the adjacent support 5.

The upper end portions 63 of the levers 60 are reduced and formed to conform to the shape of the upper end portions 23 of the levers 18. These upper end portions 63 of the levers 60 fit between the members 16 at the ends of the associated spring ring 9. The middle portions of the levers 60 have obtuse-angled notches in their inner faces. The lower wall of each of these notches is relatively short as indicated at 64 while the upper wall of the notch is longer as indicated at 65.

The rock shaft 27 associated with each pair of levers 60 is journaled in aligned openings in the upper end portions of the supporting members 5 and 6 on an end portion of the axle 2 so that the outer end portion of the rock shaft will extend into the space between the notches in the inner faces of the associated levers 60 and the axis of the rock shaft will be located at the level of the lines of juncture between the upper and lower walls of the notches in the inner faces of the levers 60. In the modified form of brake ring spreading mechanism, the cams 28 are disposed so that the shorter angular cam projections 29 will be turned downward and the longer angular cam projection 30 of each cam 28 will be turned upward. The side walls of the cam projections 30 of each cam 28 therefore will contact flatwise with the relatively long inclined walls 65 of the notches in the inner faces of the associated levers 60 and the inclined walls of the shorter cam projection 29 will contact flatwise with the side walls 64 of the notches when the levers 60 are in the positions shown in Figures 9 and 10. Rocking of the rockshafts 27 of the modified form of brake ring spreading mechanism will cause the upper end portions of the levers 60 to swing away from each other, thus spreading the ends of the associated brake rings and applying the brakes on the front or steering wheels. Greater leverage is provided when the form of brake ring spreading mechanism shown in Figures 3 to 6 inclusive, is used than when the form of brake ring spreading mechanism shown in Figures 8 and 9 is employed. The form of brake ring spreading mechanism shown in Figures 3 to 6 inclusive therefore is adapted to meet heavier service requirements than the modified form of brake ring spreading mechanism.

The operation of the modified form of brake ring spreading mechanism otherwise is identical in essential respects with the operation of the previously described form of brake ring spreading mechanism.

Obviously, the invention is susceptible of embodiment in forms other than those which are illustrated in the accompanying drawings, and I therefore consider as my own all such modifications and adaptations thereof as fairly fall within the scope of the appended claims.

I claim:—

1. In a brake mechanism for automobiles, the combination with a brake drum, of a split brake ring disposed within said drum and adapted to be expanded against the inner periphery of said drum, a pair of pivoted levers operable to spread the ends of said brake ring to expand said brake ring against the drum, a cam disposed between said levers and operable to actuate said levers to effect spreading of the ends of said brake ring, said levers having cooperative notches in their adjacent faces for producing a space for the reception of said cam, each of said notches having oppositely inclined walls.

2. In a brake mechanism for automobiles, the combination with a brake drum, of a split brake ring disposed within said drum and adapted to be expanded against the inner periphery of said drum, a pair of pivoted levers operable to spread the ends of said brake ring to expand said brake ring against the drum, a cam disposed between said levers and operable to actuate said levers to effect spreading of the ends of said brake ring, said levers having cooperative notches in their adjacent faces for producing a space for the reception of said cam, each of said notches having oppositely inclined walls, said cams conforming substantially in cross sectional configuration to the space that is produced by said notches between said levers.

3. In a brake mechanism for automobiles, the combination with a brake drum, of a split brake ring disposed within said brake drum, said brake ring having semi-cylindrical complementary members extending inwardly from the ends of said brake ring, an inwardly extending socket member on the inner periphery of said brake ring intermediate the ends of said brake ring, said socket member being adapted to engage with a depending support on the axle of the automobile, whereby said brake ring will be held against turning about its axis within said brake drum, a pair of pivoted spreader levers having the upper end portions thereof disposed between said semi-circular members on the ends of said brake ring, a rock shaft extending between said levers, and a cam on said rock shaft between said levers, said cam being adapted when said rock shaft is rocked to cause the upper end portions of said levers to be swung apart, whereby the ends of said brake ring will be spread apart and said brake ring will be expanded against the associated brake drum.

4. In a brake mechanism for automobiles, the combination with a brake drum, of a split brake ring disposed within said brake drum, said brake ring having semi-cylindrical complementary members extending inwardly from the ends of said brake ring, an inwardly extending socket member on the inner periphery of said brake ring intermediate the ends of said brake ring, said socket member being adapted to engage with a depending support on the axle of the automobile, whereby said brake ring will be held against turning about its axis within said brake drum, a pair of pivoted spreader levers having the upper end portions thereof disposed between said semi-circular members on the ends of said brake ring, a rock shaft extending between said levers, and a cam on said rock shaft between said levers, said cam being adapted when said rock shaft is rocked to cause the upper end portions of said levers to be swung apart, whereby the ends of said brake ring will be spread apart and said brake ring will be expanded against the associated brake drum, and a retractile spring between the end portions of said brake ring for contracting said brake ring.

5. In a brake mechanism of the character described, the combination with a brake drum of a split resilient brake ring disposed within said drum and held against turning about its axis within said drum, inwardly extending members at the ends of said brake ring, a pair of brake ring spreading levers having a common fulcrum and having end portions disposed between said inwardly extending members on the brake ring ends, said levers having similar cooperative notches in the adjacent faces thereof, each of said notches subtending an obtuse angle and having one wall of greater length than the other wall of the notch, a rock shaft extending between said notches, the axis of said rock shaft being parallel to the axis of swinging movement of the levers and being located at the level of the junctures of the walls of each of said notches, a cam on said rock shaft having a relatively short angular cam projection fitting between the shorter walls of said notches and having a longer angular cam projection fitting between the longer walls of said notches.

GUS WALKER.